United States Patent [19]
Fowler et al.

[11] 3,776,506
[45] Dec. 4, 1973

[54] VALVE STRUCTURE HAVING FLUID PRESSURE ACTUATED SEALING MEMBERS

[75] Inventors: James M. Fowler; Willard E. Kemp; Jerry B. Tomlin, all of Houston, Tex.

[73] Assignee: ACF Industries, Incorporated, New York, N.Y.

[22] Filed: Dec. 15, 1971

[21] Appl. No.: 208,100

[52] U.S. Cl.................. 251/172, 251/174, 251/315
[51] Int. Cl............................................ F16k 25/00
[58] Field of Search................... 251/171, 172, 173, 251/174

[56] References Cited
UNITED STATES PATENTS

| | | | |
|---|---|---|---|
| 3,497,177 | 2/1970 | Halsey | 251/174 X |
| 3,421,733 | 1/1969 | Stewart | 251/172 |
| 3,047,265 | 7/1962 | Kaiser | 251/174 X |
| 3,617,025 | 11/1971 | Gerbic | 251/172 |
| 3,095,004 | 6/1963 | Jackson | 251/174 X |

FOREIGN PATENTS OR APPLICATIONS

| | | | |
|---|---|---|---|
| 1,213,078 | 10/1959 | France | 251/172 |

*Primary Examiner*—Harold W. Weakley
*Attorney*—Eugene N. Riddle

[57] ABSTRACT

A valve structure has a valve member mounted within a valve chamber and forms a body cavity between the valve member and the valve body. Upstream and downstream annular sealing members are mounted on opposed sides of the valve member for limited relative longitudinal movement and are adapted to be urged against the valve member by fluid pressure. A separate valve control means for each sealing member is mounted on the exterior of the valve body and permits communication of the associated sealing member to fluid pressure from either the body cavity or the adjacent flow passage. Normally the associated sealing member is exposed to the higher fluid pressure for urging the sealing member into tight sealing engagement with the valve member and if fluid leaks past the upstream sealing member into the body cavity, the downstream sealing member is urged into tight engagement with the valve member from the increase in body fluid pressure. The valve control means includes a pilot valve for each sealing member having a slidable shuttle for selectively communicating the several fluid conduits.

1 Claim, 8 Drawing Figures

3,776,506

VALVE STRUCTURE HAVING FLUID PRESSURE ACTUATED SEALING MEMBERS

BACKGROUND OF THE INVENTION

Heretofore, spherical plug or ball valves have had opposed upstream and downstream sealing members which have been actuated by fluid pressure to exert an increased sealing pressure against the valve ball thereby to minimize leakage. For example, U. S. Pat. No. 3,013,766 dated Dec. 19, 1961 shows a spherical plug valve in which sealing rings are mounted on opposed sides of the valve ball for limited longitudinal movement relative to the valve ball. Fluid pressure is employed to move the sealing rings into tight engagement with the valve ball, and then to retract the sealing rings for rotation of the ball. The fluid pressure for actuating the sealing members or rings also has been provided heretofore from external fluid sources as well as from the adjacent flow passages.

BRIEF DESCRIPTION OF THE PRESENT INVENTION

A spherical plug or ball valve is provided having a valve ball mounted within the valve chamber and forming a body cavity between the valve body and valve ball. Upstream and downstream annular sealing members are mounted on opposed sides of the valve ball for limited longitudinal movement relative to the valve ball. Fluid pressure is provided to urge the sealing members into engagement with the valve ball thereby to minimize leakage past the sealing members. The sealing members are each exposed to fluid pressure in both the body cavity and in the adjacent flow passage.

In one embodiment, a separate pilot control valve is mounted on the outside of the valve body for each of the sealing members and is effective to selectively communicate the associated sealing member to the higher of either the body cavity fluid pressure or the fluid pressure in the adjacent flow passage. By this arrangement, if fluid leaks past the upstream sealing member into the body cavity, the pressure in the body cavity will increase and if it is greater than the pressure in the downstream flow passage, fluid pressure from the body cavity will urge the downstream sealing member into tight sealing relation with the valve ball to minimize any leakage past the downstream sealing member. The pilot control comprises a slidable shuttle and is accessible from outside the main valve body in the event of a malfunctioning. The pilot control is self-actuated and does not require any external or manual control.

If desired, manually operated control valves may be employed to permit selective communication of fluid pressure to the sealing members from either the body cavity or the adjacent flow passage for urging the sealing members into engagement with the valve ball. Thus, the fluid pressure-actuated sealing members are responsive to fluid pressure from the body cavity and may be exposed to such body fluid pressure selectively, such as by self actuated pilot controls or by separate manually operated controls.

The invention accordingly comprises the constructions hereinafter described, the scope of the invention being indicated in the following claims.

In the accompanying drawings, in which several of various possible embodiments of the invention are illustrated, FIG. 1 is a sectional view of a spherical plug valve structure comprising one embodiment of the present invention pilot control means mounted on the exterior of the valve;

Figure 7:
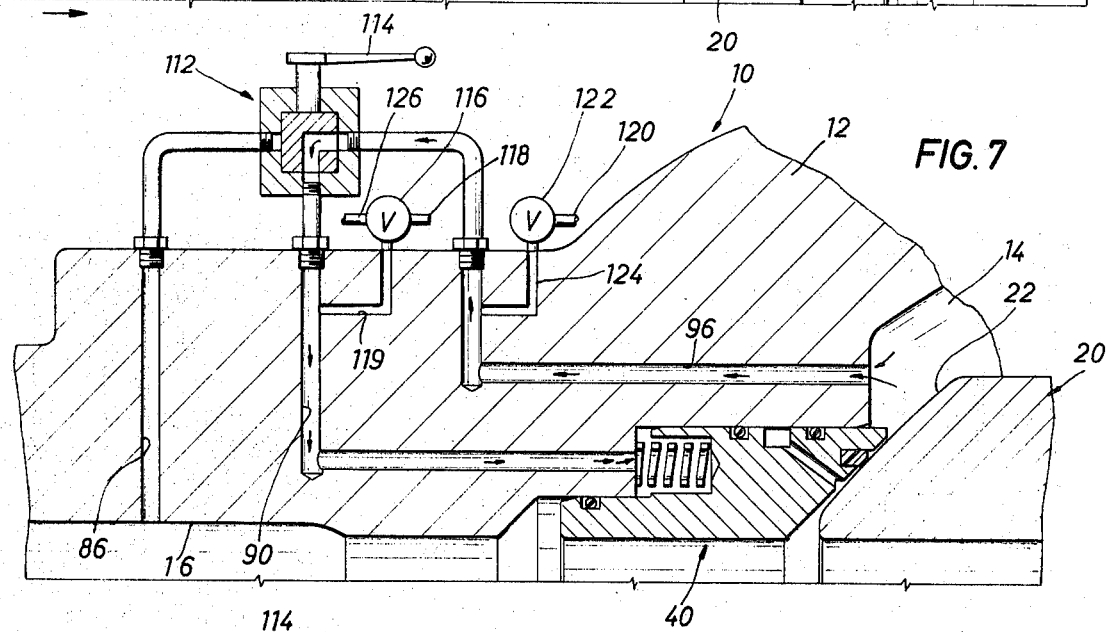
Figure 8:
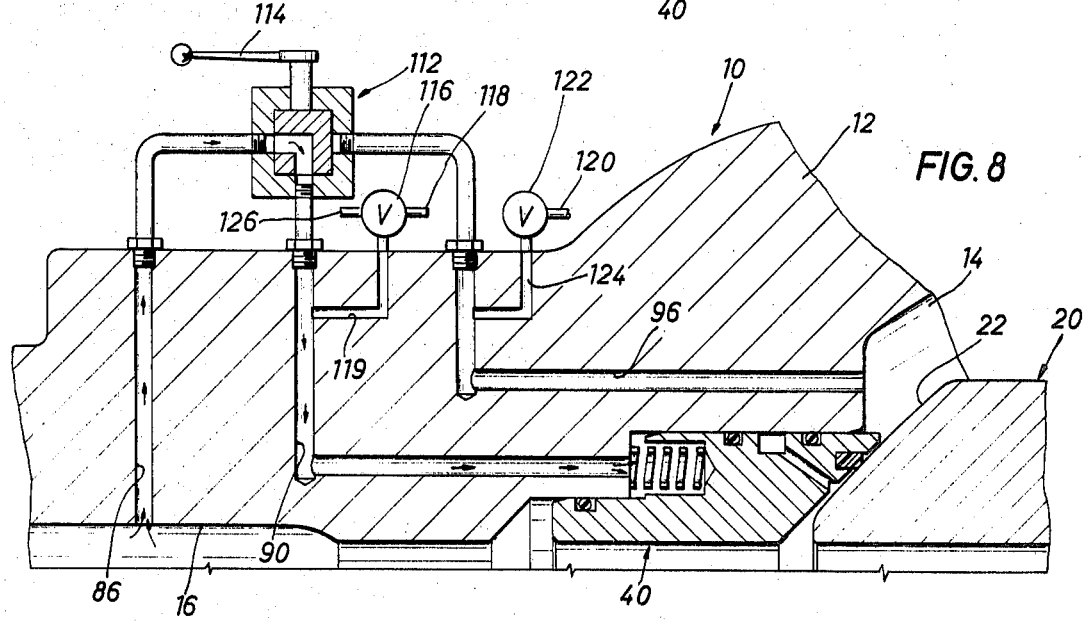

FIG. 7 is another embodiment of the present invention in which the control valve means comprises a manually actuated control valve member to control the communication of the fluid pressure to the sealing member and indicating the sealing member in communication with the body fluid pressure; and FIG. 8 is a view similar to FIG. 7 but showing the manually actuated valve control means in a position in which the sealing member is in fluid communication with upstream fluid pressure.

Figure 1:
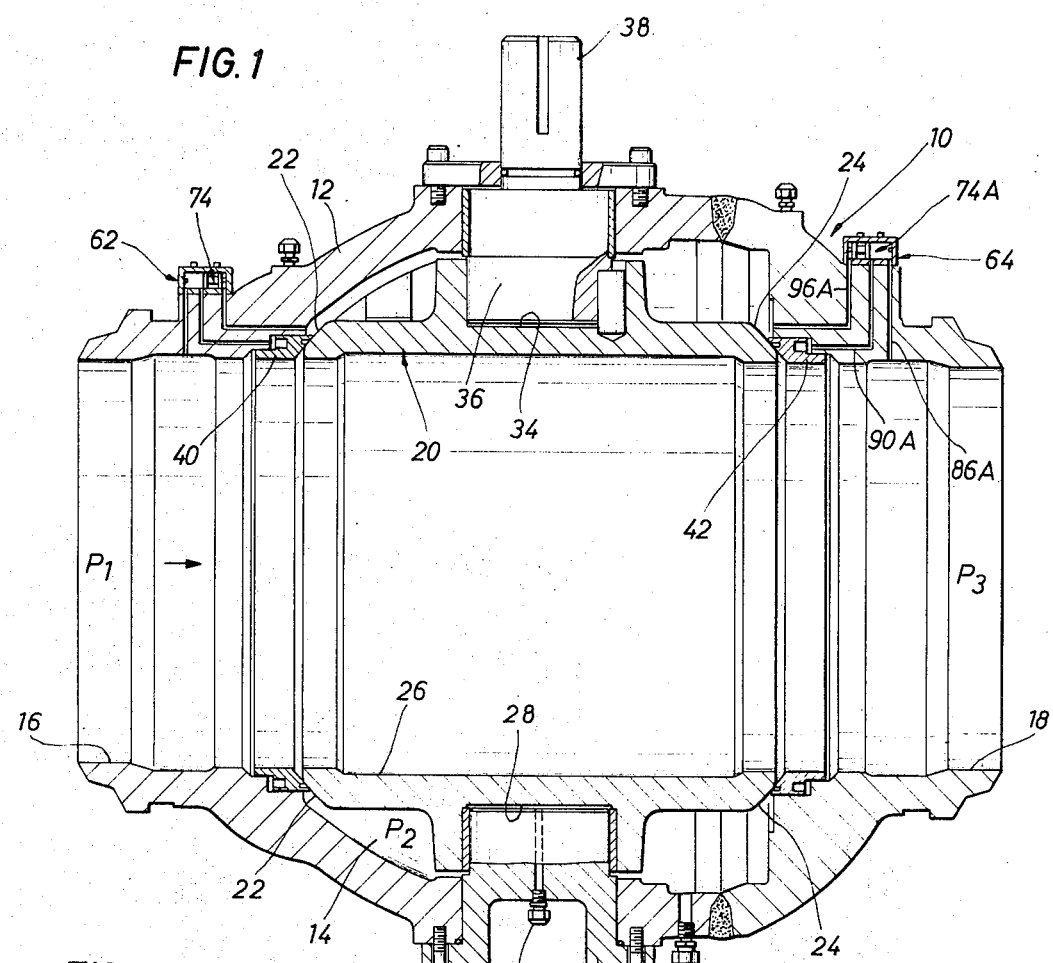

Referring now to the drawings for a better understanding of this invention and more particularly to the embodiment shown in FIGS. 1-5, a valve structure which may be a spherical plug or ball valve structure is indicated generally at 10 in FIG. 1 and has a valve body 12 defining a valve chamber or body cavity 14. Valve body 12 has an upstream flow passage 16 and a downstream flow passage 18. The outer end portions of valve body 12 defining flow passages 16 and 18 may be provided with screw threads to provide a connection for valve structure 10 with suitable conduits (not shown) in a flow system, as well known in the art.

Positioned in body cavity 14 is a rotatable valve ball 20 having spherical annular seating surfaces 22 and 24 and a flow passage 26 in alignment with flow passages 16 and 18 in the open position of valve ball 20 as shown in FIG. 1. The lower portion of valve ball 20 has a generally cylindrical opening or bore 28 therein receiving a trunnion 30 on which valve ball 20 is mounted for rotation. A suitable lubricant fitting 32 is provided to provide lubrication for trunnion 30. The upper portion of valve ball 20 has a generally cylindrical opening or bore 34 in which an upper shaft 36 is secured to valve ball 20. Shaft 36 has a reduced upper end portion 38 and suitable drive means (not shown) may be connected to upper end portion 38 to rotate valve ball 20 about trunnion 30 between open and closed positions with relation to flow passages 16 and 18.

Mounted adjacent opposed ends of valve ball 20 are upstream sealing member 40 and downstream sealing member 42 which are annular and adapted to fit against respective seats 22 and 24 of valve ball 20. Sealing members 40 and 42 are pressure actuated, that is, the sealing members are urged by fluid pressure against seats 22 and 24 to provide a tight seal between valve ball 20 and sealing members 40 and 42.

Figure 2:
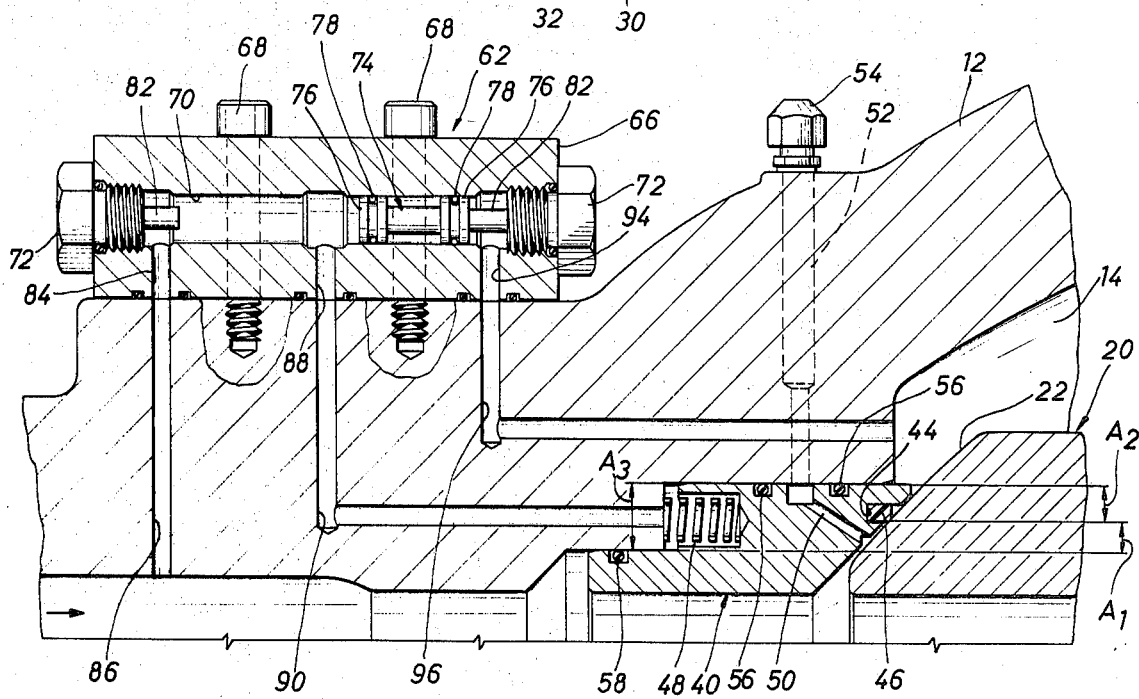
FIG. 2 is an enlarged fragment of FIG. 1 showing a sealing member for the valve ball and a pilot control means for controlling the fluid pressure exerted against the sealing member.

Referring particularly to FIG. 2 sealing member 40 is illustrated in detail, it being understood that sealing member 42 is generally identical. Sealing member 40 has an annular groove 44 therein having an axis generally parallel with the axis of sealing member 40. Positioned in groove 44 is an insert 46 formed of a resilient plastic material which is capable of flowing into and forming a seal with minor surface irregularities. Insert 46 extends beyond the adjacent face of sealing member 40 and forms the sealing surface for contact with adjacent seating surface 22 on valve ball 20. It has been found that polytetrafluoroethylene, sold under the trademark "Teflon" provides a very desirable insert since it has an exceedingly low coefficient of friction and is inert to most ladings. The "Teflon" can be either virgin, filled with glass, or other fillers which will increase its load bearing characteristics.

A spring 48 continuously urges sealing member 40 slightly toward valve ball 20. Sealing member 20 includes a lubricant port 50 in communication with lubricant conduit 52 in valve body 12. A suitable fitting 54 is provided so that lubricant may be inserted therein. O-rings 56 on each side of lubricant port 50 provide seals to minimize any leakage of lubricant between sealing member 40 and the adjacent portion of valve body 12. O-ring seal 58 provides a seal between flow line fluid pressure and the remainder of the valve.

Pilot control valve means generally indicated 62 and 64 for respective sealing members 40 and 42 are generally identical and only control valve 62 is described in detail, it being understood that pilot valve 64 functions in a similar manner. Pilot valve 62 includes body 66 secured to the outer surface of valve body 12 by suitable threaded studs 68. Body 66 has a central bore 70 which is closed by end plugs 72. Mounted in central bore 70 for sliding movement is a shuttle or pilot valve member generally indicated 74 having spaced enlarged shoulders 76 with O-rings 78 to provide seals with the adjacent wall surface defining central bore 70. Pilot valve member 74 includes a reduced diameter intermediate portion 80 between shoulders 76. Plug 72 includes end stops 82 which are adapted to engage the adjacent respective end of shuttle valve 74 for positioning thereof at a predetermined location.

Central bore 70 has an end port 84 in fluid communication with conduit or line 86 to upstream flow line 16. Port 88 from bore 70 is in fluid communication with conduit or line 90 to provide fluid pressure to a fluid chamber at a rear face of sealing member 40 for energizing sealing member 40. Port 94 from bore 70 is in fluid communication with conduit or line 96 leading to body cavity 14 to communicate fluid pressure between body cavity 14 and bore 70. Lines 86A, 90A, 96A and shuttle valve member 74A in pilot control valve 64 are similar in function to lines 86, 90, 96 and shuttle valve member 74.

Referring to FIG. 1 in which valve ball 20 is shown in an open position for normal operation, P1 indicates upstream fluid pressure, P2 indicates body cavity pressure, and P3 represents downstream fluid pressure. In this position, control valve member 74 is in its right position and control valve member 74A is in its left position as shown in FIG. 1. As valve ball 20 is open, upstream line pressure P1 is equal to downstream line pressure P3 and body pressure P2 is less than the flow line pressure. A1 in FIG. 2 indicates the differential area of sealing member 40 exposed to upstream line pressure for urging member 40 away from seat 22, A2 represents the differential area exposed to body fluid pressure for urging sealing member 40 away from seat 22, and A3 represents the differential area of sealing member 40 exposed to fluid pressure for urging sealing member 40 toward seat 22. Sealing members 40 and 42 are urged against valve ball 20 with a force F as follows:

$$F = P1 (A3) + \text{spring force} - P1 (A1) - P2 (A2)$$

$$F = P1 (A3 - A1) - P2 (A2) + \text{spring force}$$

Figure 3:
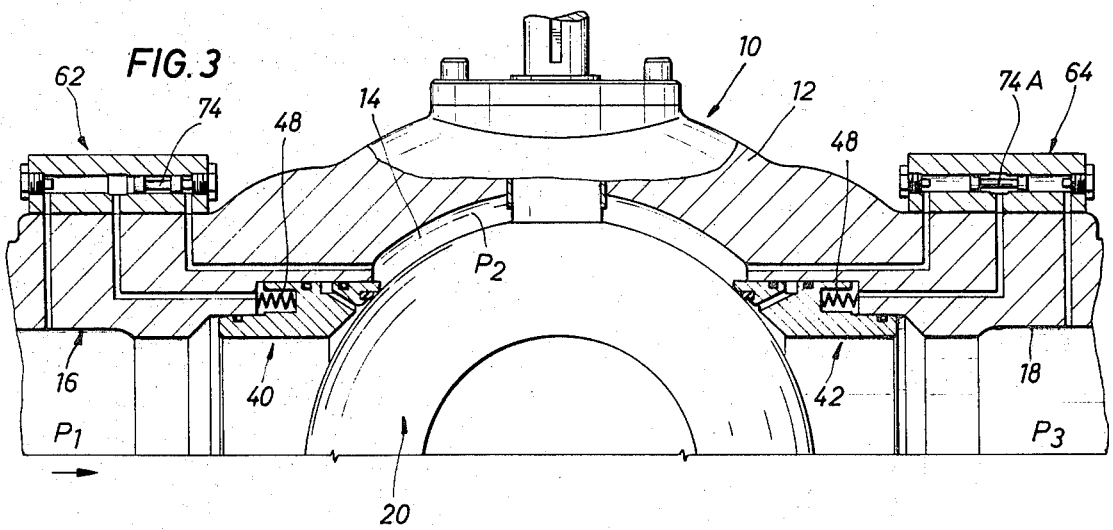
FIG. 3 is a sectional view of the upper portion of the valve structure with the valve ball in a closed position and indicating one position of the pilot control means when the upstream fluid pressure is greater than the downstream fluid pressure and the body fluid pressure is less than the upstream fluid pressure but is equal to the downstream fluid pressure.

Referring particularly to FIG. 3 with valve ball 20 in a closed position, upstream fluid pressure P1 is greater than body pressure P2. Body pressure P2 is equal to downstream fluid pressure P3. As P2 equals P3 shuttle control valve 74A is in its intermediate or neutral position as shown in FIG. 3 and sealing member 42 is held against valve ball 20 only by the force exerted by spring 48 of sealing member 42. Upstream sealing member 40 exerts a force FA against valve ball 20 as follows:

$$FA = P1 (A3) + \text{spring force} - P1 (A1) - P2 (A2)$$

$$FA = P1 (A3 - A1) - P2 (A2) + \text{spring force}$$

Figure 4:
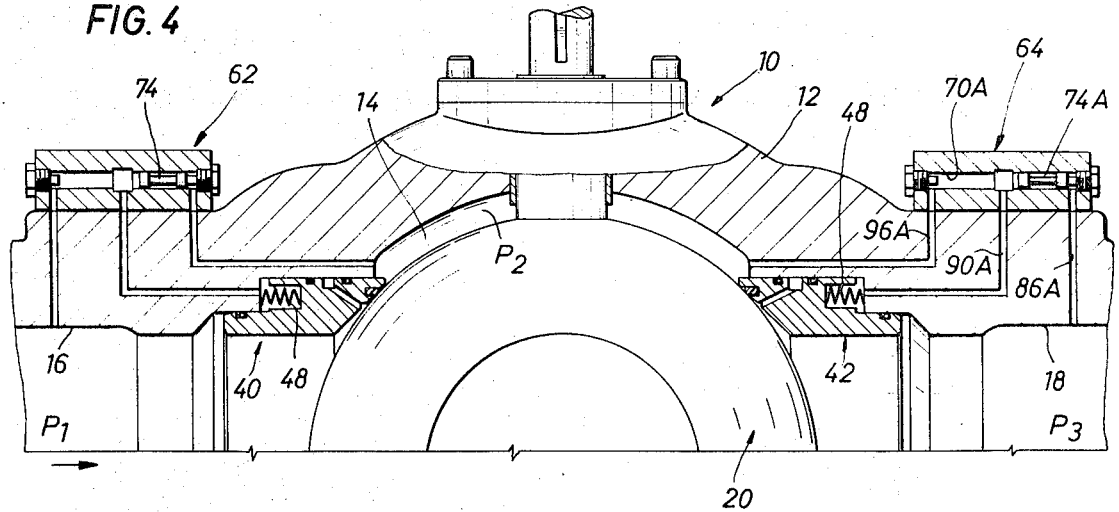
FIG. 4 is a view similar to FIG. 3 but showing the pilot control means in another position.

FIG. 4 illustrates the position of control pilot valves 74 and 74A upon a leakage of fluid past upstream sealing member 40. A leakage of fluid past sealing member 40 increases body pressure P2 to a level greater than downstream fluid pressure P3. In this position, pilot valve 74A moves to its right position as shown in FIG. 4 and body pressure is communicated through line 96A, bore 70A, and line 90A to sealing member 42 to urge sealing member 42 against valve ball 20. Thus, in this position, downstream sealing member 42 is responsive to body pressure P2 and when fluid leakage occurs past upstream sealing member 40, the increase in body pressure results in an increasing force being exerted against downstream sealing member 42 and valve ball 20 thereby to minimize or prevent any leakage of fluid past downstream sealing member 42. The force exerted by body pressure FB is as follows:

$$FB = P2 (A3) + \text{spring force} - P2 (A2) - P3 (A1)$$

$$FB = P2 (A3 - A1) - P3 (A1) + \text{spring force}.$$

Figure 5:
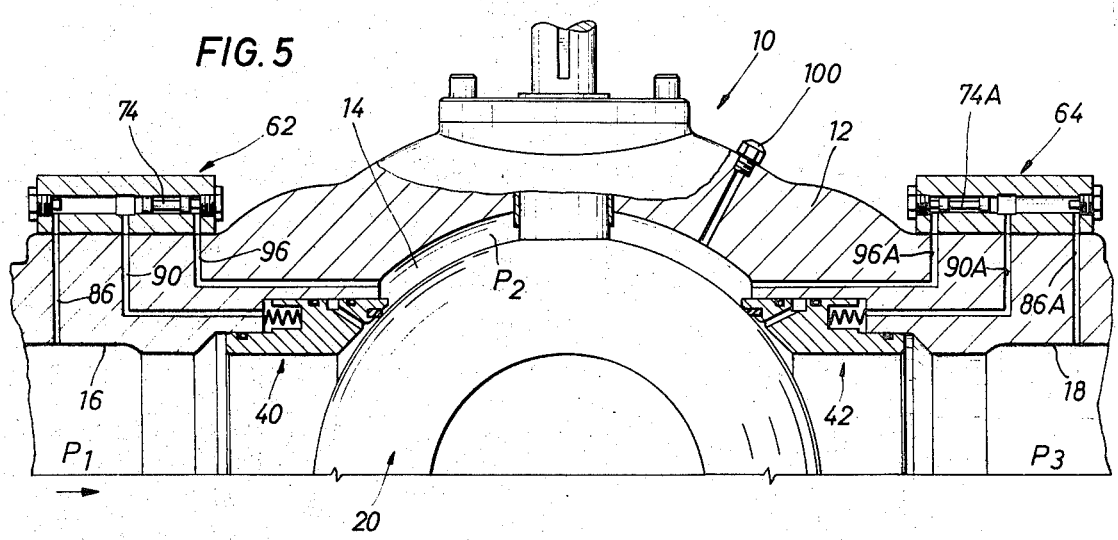
FIG. 5 is a view similar to FIGS. 3 and 4 but showing the pilot control means in an additional position which is obtained upon testing of the valve in a block and bleed operation.

Referring to FIG. 5, sealing members 40 and 42 and control pilot valves 74 and 74A are in a so-called "block and bleed" position for checking sealing members 40 and 42 before the valve is placed in service to determine if the sealing members leak. As indicated in FIG. 5, full pressure is provided in flow passages 16 and 18 to have a maximum P1 and P3. A vent indicated at 100 in FIG. 5 is provided for body cavity 14 to permit bleeding of fluid pressure from body cavity 14. Pressure P2 after bleedoff is much less than upstream pressure P1 and downstream pressure P3. Under this arrangement, sealing members 40 and 42 are in fluid communication with the associated flow line pressure and are urged tightly against valve ball 20 by the flow line pressure. Any leakage of fluid past sealing members 40 and 42 may be detected by pressure P2 and body vent 100.

Figure 6:
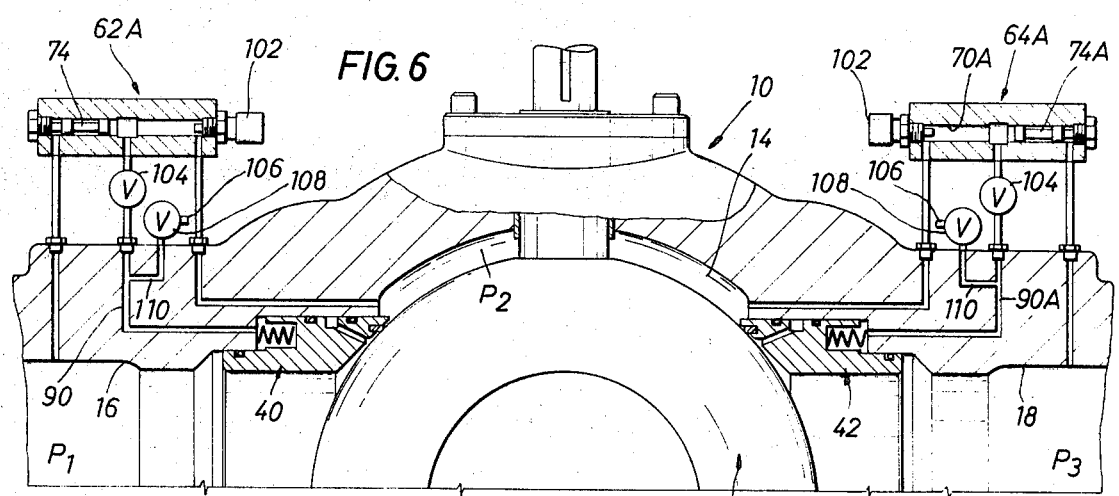
FIG. 6 is a view similar to FIGS. 3-5 but showing a modified embodiment in which the pilot control means is provided with safety relief means and a source of external fluid pressure is provided for the sealing members.

Referring now to FIG. 6, a modified arrangement is illustrated in which control valves 62A and 64A are provided with a safety relief valve 102 in communication with the fluid pressure in body cavity 14. Pilot control valves 74 and 74A are shown in the position when body pressure P2 is higher than downstream line pressure P1 and upstream line pressure P3 which would occur from a high ambient temperature adjacent valve 10 such as might result from a fire or like condition. Sealing members 40 and 42 are in fluid communication with the high body pressure P2 and are therefore urged tightly against valve ball 20. In the event body pressure P2 reaches a dangerously high level, safety valve 102 will be actuated to reduce body pressure P2 to a desirable level. If desired, a safety valve may be attached to body 12 and communicate directly with body cavity 14.

In some instances, it might be desirable to have an external fluid source for urging valve members 40 and 42 against valve ball 20. The modified arrangement shown in FIG. 6 provides an arrangement so that, if desired, an external source of fluid pressure may be employed to urge sealing members 40 and 42 against valve ball 20 with a predetermined force. Valves 104 are provided in lines 90 and 90A to stop the flow of fluid to control valves 62A and 64A. An external source of fluid may then be suitably connected to conduit 106 leading to valve 108 and valve 108 may be moved to an open position to permit fluid pressure to line 110 to sealing members 40 and 42. Thus, the fluid pressure applied to sealing members 40 and 42 may be predetermined by such an external source of fluid pressure. Referring to the embodiment shown in FIGS. 7 and 8, an arrangement is provided in which a manual control means selectively communicates the sealing members with adjacent flow line pressure or body pressure, as desired. A manual control valve 112 is connected to line 90 for supplying fluid pressure against sealing member 40 and has a handle 114 which may be rotated manually between two positions, one position in which line 90 is in fluid communication with line 96 to body pressure in cavity 13 as shown in FIG. 7, and a second position shown in FIG. 8 in which line 90 is in fluid communication with line 86 to upstream line pressure in flow passage 16. Valve 112 is also movable to a third closed position in which the flow to line 90 is blocked.

When ball 20 is rotated, it is desirable at times to retract or remove the pressure from sealing members 40 and 42. For this purpose, a suitable valve indicated generally at 116 may be provided and may be rotated to a position opening line 118 for venting line 90 through line 119. Then, an external fluid source may be connected to conduit 120 leading to valve member 122 and valve member 122 moved to an open position to permit fluid pressure through line 124 and line 96 to body cavity 13. Body pressure in cavity 14 will tend to urge sealing members 40 and 42 away from ball 20 when line 90 is vented to atmosphere thereby to retract sealing members 40 and 42 from valve ball 20 before rotation of valve ball 20. In most instances it is not necessary to increase the fluid pressure in body cavity 14 in order to easily rotate valve ball 20. If the fluid pressure in body cavity 14 and the adjacent flow passage is equal, sealing members 40 and 42 are pressure balanced and urged toward engagement with valve ball 20 only by the force exerted by springs 48 which is relatively small.

If desired to have a separate external fluid source for urging sealing member 40 into engagement with valve ball 20, line 126 to valve 116 may be connected to a suitable source of fluid and valve member 116 may be rotated to permit communication of lines 119 and 126 with line 90 to provide fluid pressure for sealing member 40. In this position valve 112 would be moved to a closed position with respect to line 90.

From the foregoing, control means has been provided for sealing members adjacent a valve ball which permits fluid pressure to be applied against the sealing members from either line fluid pressure or body fluid pressure, whichever is the higher. Body fluid pressure may be employed to urge the sealing members against the valve ball, and particularly upon leakage past an upstream sealing member and a buildup of body pressure, any leakage past the downstream sealing member is minimized as the body pressure urges the downstream sealing member into a tighter engagement with the valve ball.

What is claimed is:

1. A ball valve structure comprising a valve body having a chamber therein and upstream and downstream flow passages in communication with the valve chamber, a valve ball mounted within the valve chamber and forming a body cavity between the valve ball and valve body, means to rotate the valve ball between open and closed positions to control the flow of fluid through said passages, an annular sealing member on opposed sides of the valve ball providing upstream and downstream sealing members, said sealing members mounted for limited longitudinal movement relative to the valve ball to provide a varying sealing pressure against the valve ball, a separate pilot valve for each sealing member mounted on an exterior surface of the valve body, each pilot valve including a body having a central cylindrical bore and three ports communicating with the bore and spaced along the valve body to provide end and intermediate ports, a cylindrical landed shuttle member slidable back and forth within the central bore between positions in which the end ports are in communication with the intermediate port, a first fluid conduit located internally of the bodies between the body cavity and one end port, a second fluid conduit located internally of the bodies between the associated sealing member and the intermediate port and a third fluid conduit located internally of the bodies between the associated flow passage and the other end port, said shuttle member having means responsive to the reaching of a body fluid pressure higher than the fluid pressure in the associated flow line moving to a position in which the first fluid conduit is in communication with the second fluid conduit thereby to urge the associated sealing member into tight engagement with the valve ball and upon the reaching of a fluid pressure in the associated flow line higher than the fluid pressure in the valve body moving to a position in which the third fluid conduit is in communication with the second fluid conduit to urge the associated sealing member toward the valve ball.

* * * * *